(12) United States Patent
Iori et al.

(10) Patent No.: US 9,914,598 B2
(45) Date of Patent: Mar. 13, 2018

(54) SQUARING DEVICE AND COUNTER EJECTOR, AND BOX-MANUFACTURING MACHINE

(71) Applicant: MITSUBISHI HEAVY INDUSTRIES PRINTING & PACKAGING MACHINERY, LTD., Mihara-shi, Hiroshima (JP)

(72) Inventors: Shinya Iori, Mihara (JP); Osamu Hatano, Mihara (JP); Kazuya Sugimoto, Mihara (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 14/912,922

(22) PCT Filed: Sep. 4, 2014

(86) PCT No.: PCT/JP2014/073306
§ 371 (c)(1),
(2) Date: Feb. 19, 2016

(87) PCT Pub. No.: WO2015/072215
PCT Pub. Date: May 21, 2015

(65) Prior Publication Data
US 2016/0200063 A1    Jul. 14, 2016

(30) Foreign Application Priority Data

Nov. 13, 2013    (JP) .................................. 2013-235091

(51) Int. Cl.
*B65G 59/06*    (2006.01)
*B65G 57/09*    (2006.01)
(Continued)

(52) U.S. Cl.
CPC .............. *B65G 57/09* (2013.01); *B31B 50/00* (2017.08); *B65H 31/38* (2013.01); *B31B 50/044* (2017.08);
(Continued)

(58) Field of Classification Search
CPC .... B65H 31/38; B65H 31/3081; B65H 31/34; B65H 9/101
(Continued)

(56) References Cited

U.S. PATENT DOCUMENTS 2,943,539 A * 7/1960 Lytle ...................... B65G 57/00
414/788.4
2,992,823 A * 7/1961 Forrester ................ B65H 31/38
271/222

(Continued)

FOREIGN PATENT DOCUMENTS

CN     101784468 A     7/2010
CN     102289888 A     12/2011
(Continued)

OTHER PUBLICATIONS

Partial Supplementary European Search Report in EP Application No. 14862409.1, dated Jul. 15, 2016.
(Continued)

*Primary Examiner* — Gregory W Adams
(74) *Attorney, Agent, or Firm* — Kanesaka Berner and Partners LLP

(57) ABSTRACT

A squaring device provided to a counter ejector part that stops flat cardboard boxes fed from an upstream, using a front stop, in a downstream part of a box-manufacturing machine, receives and stacks the flat cardboard boxes in a stacking part in a hopper part, and ejects the stack as a batch. It includes a squaring plate that, while the stacking part retains in a stack position during a retention interval, squares
(Continued)

the cardboard boxes stacked on the stacking part, in conjunction with the front stop, the retention interval being set in accordance with a feed speed of the cardboard boxes and a count setting for a stack of the cardboard boxes. A reciprocation driving unit drives the squaring plate to reciprocate toward and away from the front stop, and is configured to vary a speed ratio of a squaring speed for reciprocating the squaring plate, to the feed speed.

8 Claims, 7 Drawing Sheets

(51) Int. Cl.
| | |
|---|---|
| *B65H 31/38* | (2006.01) |
| *B31B 50/00* | (2017.01) |
| *B31B 50/26* | (2017.01) |
| *B31B 50/98* | (2017.01) |
| *B31B 100/00* | (2017.01) |
| *B31B 120/30* | (2017.01) |
| *B31B 50/04* | (2017.01) |
| *B31B 110/35* | (2017.01) |

(52) U.S. Cl.
CPC .............. *B31B 50/26* (2017.08); *B31B 50/98* (2017.08); *B31B 2100/00* (2017.08); *B31B 2100/0022* (2017.08); *B31B 2110/35* (2017.08); *B31B 2120/30* (2017.08)

(58) Field of Classification Search
USPC .............. 271/226, 233, 236, 241; 414/788.8, 414/788.9, 789, 789.1
See application file for complete search history.

(56) References Cited

U.S. PATENT DOCUMENTS

| | | | | | |
|---|---|---|---|---|---|
| 3,127,820 | A | * | 4/1964 | Carter | B65G 57/035 |
| | | | | | 414/788.9 |
| 3,982,751 | A | * | 9/1976 | Obenshain | B65H 31/38 |
| | | | | | 271/221 |
| 4,130,207 | A | * | 12/1978 | Cogswell | B65H 29/66 |
| | | | | | 271/3.05 |
| 4,147,342 | A | * | 4/1979 | Naramore | B65H 31/36 |
| | | | | | 271/221 |
| 4,346,882 | A | * | 8/1982 | Pessina | B65H 31/38 |
| | | | | | 271/221 |
| 4,494,901 | A | * | 1/1985 | Wood | B65H 31/34 |
| | | | | | 271/221 |
| 4,548,399 | A | * | 10/1985 | Heider | B65H 31/40 |
| | | | | | 271/221 |
| 4,556,211 | A | * | 12/1985 | Carr | B65H 31/38 |
| | | | | | 271/221 |
| 4,657,239 | A | * | 4/1987 | Ikesue | B65H 9/101 |
| | | | | | 271/227 |
| 5,368,288 | A | | 11/1994 | Philipp et al. | |
| 5,423,656 | A | * | 6/1995 | Filsinger | B65H 31/38 |
| | | | | | 271/221 |
| 5,890,713 | A | * | 4/1999 | Hofmann | B65H 31/38 |
| | | | | | 271/221 |
| 6,129,503 | A | | 10/2000 | Schenone | |
| 6,168,154 | B1 | * | 1/2001 | Asahara | B42C 1/12 |
| | | | | | 270/58.12 |
| 6,412,773 | B1 | * | 7/2002 | Takagi | B65H 9/101 |
| | | | | | 271/171 |
| 6,454,257 | B1 | * | 9/2002 | Cisar | B65H 5/36 |
| | | | | | 198/456 |
| 7,658,378 | B2 | * | 2/2010 | Lappok | B65H 9/00 |
| | | | | | 271/221 |
| 9,033,646 | B2 | | 5/2015 | Kokubo et al. | |
| 2009/0060604 | A1 | * | 3/2009 | Hattori | B65H 31/3081 |
| | | | | | 399/361 |
| 2010/0190626 | A1 | | 7/2010 | Taketsugu et al. | |
| 2011/0268550 | A1 | | 11/2011 | Kokubo et al. | |
| 2011/0268551 | A1 | * | 11/2011 | Kokubo | B65H 31/20 |
| | | | | | 414/796 |
| 2013/0154186 | A1 | | 6/2013 | Kang | |
| 2014/0148321 | A1 | | 5/2014 | Hatano et al. | |

FOREIGN PATENT DOCUMENTS

| | | | |
|---|---|---|---|
| DE | 102007052319 | A1 | 5/2009 |
| JP | 59-186870 | A | 10/1984 |
| JP | 62-23262 | U | 2/1987 |
| JP | 4-9728 | U | 1/1992 |
| JP | 2011-230441 | A | 11/2011 |
| JP | 2012-157994 | A | 8/2012 |
| JP | 2013-116597 | A | 6/2013 |

OTHER PUBLICATIONS

Extended European Search Report in EP Application No. 14862409.1, dated Oct. 18, 2016.
International Search Report in International Application No. PCT/JP2014/073306, dated Nov. 25, 2014.
Decision to Grant a Patent in JP Application No. 2013-235091, dated Nov. 18, 2014.
International Preliminary Report on Patentability in International Application No. PCT/JP2014/073306, dated May 26, 2016.
Office Action in CN Application No. 201480046072.8, dated Feb. 23, 2017.
Office Action in EP Application No. 14862409.1, dated Aug. 4, 2017. 7pp.
Office Action in CN Application No. 201480046072.8, dated Nov. 16, 2017. 18pp.

* cited by examiner

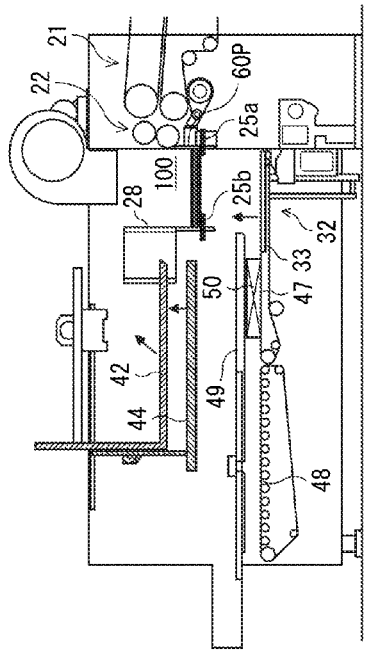
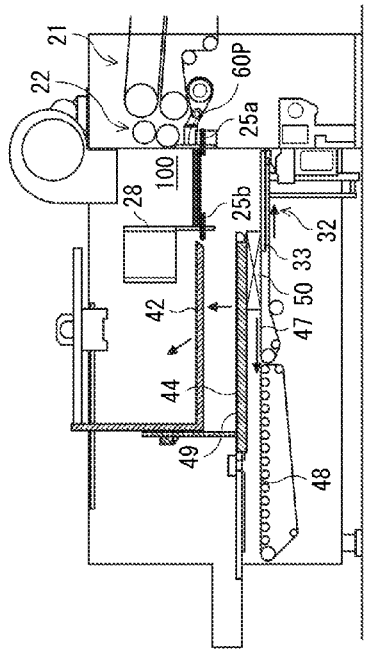
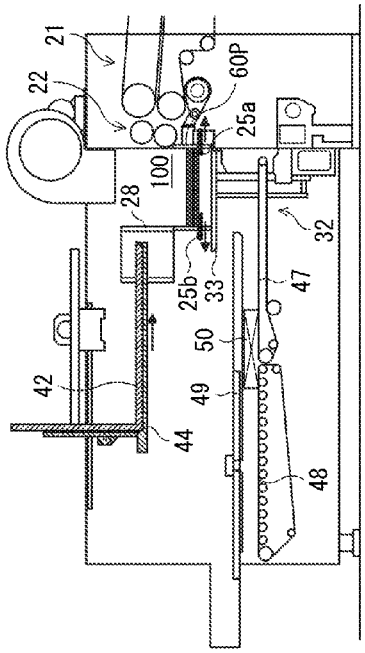

SQUARING DEVICE AND COUNTER EJECTOR, AND BOX-MANUFACTURING MACHINE

RELATED APPLICATIONS

The present application is a National Phase of International Application Number PCT/JP2014/073306, filed Sep. 4, 2014, which claims priority to Japanese Application No. JP2013-235091, filed Nov. 13, 2013.

TECHNICAL FIELD

The present invention relates to a squaring device provided to a counter ejector that is provided in the most downstream part of a box-manufacturing machine to accumulate and count cardboard boxes and to eject them as a batch, a counter ejector, and a box-manufacturing machine employing the same.

BACKGROUND ART

A counter ejector part is provided in the most downstream part of a box-manufacturing machine for manufacturing cardboard boxes, which accumulates, counts, and stacks manufactured cardboard boxes in the form of sheet, and ejects them as a batch. In a counter ejector provided in the counter ejector part, cardboard boxes that are fed in the conveyance direction through a pair of upper and lower feed rolls, and advance into a hopper part (receiving space) are hit to a front stop (front stopper plate), and are allowed to fall by their self weights or a wind pressure provided by a blower. The fallen cardboard boxes are stacked on a stacking part in the hopper part (receiving space).

Some of such counter ejectors are provided with a squaring device that carries out squaring on cardboard boxes stacked on the stacking part, to eliminate distortions, e.g., fishtails, for rectifying the cardboard boxes into proper rectangular shapes. As disclosed in Patent Document 1, a squaring device includes a front stop, and a squaring plate (referred to as a rectification plate or a squaring bar, or sometimes referred to as a spanker since it spanks one end of a cardboard box) that is arranged facing the front stop and reciprocates in the directions approaching to or departing from the front stop. The squaring plate reciprocates at a predetermined cycle, and rectifies cardboard boxes fed and fallen to the stacking part, one by one while sandwiching them in conjunction with the front stop.

Furthermore, Patent Document 2 discloses, in an apparatus wherein cardboard boxes are slid by a conveyer belt under an ejecting and stacking part, from the upstream of the conveyance direction, thereby accumulating the cardboard boxes into a predetermined stack, a technique to rectify the shape of a cardboard box at the bottom of the stack sandwiched between a front stop and a squaring plate, by providing the front stop in front of the conveyance direction of the cardboard box at the bottom of the stack, providing the squaring plate facing the front stop, and reciprocating the squaring plate.

RELATED-ART DOCUMENTS

Patent Documents

Patent Document 1: Japanese Laid-Open Patent Publication No. 2013-116597
Patent Document 2: Japanese Laid-Open Utility Model Publication No. H 04-9728

SUMMARY OF INVENTION

Issues to be Solved by the Invention

As described above, squaring plate is reciprocated at a predetermined cycle, and that reciprocation cycle is generally set according to the cycle for feeding cardboard boxes. In other words, the squaring speed that can be defined as how many times the squaring plate is reciprocated per unit time (squaring number) is generally set according to the machine speed of a box-manufacturing machine, which can be defined as how many cardboard boxes are fed per unit time. By the setting described above, the number of squaring to be carried out on a single cardboard box in a flat configuration (flat cardboard box) is maintained constant.

In a counter ejector part, once the number of cardboard boxes in a stack stacked on a stacking part reaches a count setting, that stack is ejected from the stacking part as a batch. Since a stack undergoes squaring while the stack stays on the stacking part, no squaring can be carried out once the stacked is ejected from stacking part. Hence, in a counter ejector part wherein cardboard boxes are stacked on the stacking part from the bottom, as the one described in Patent Document 1, the cardboard box at the top of a stack, which is stacked the last undergoes a reduced number of squaring, which may lead to insufficient squaring.

The count setting for a stack defining how many cardboard boxes are to be included in a stack to form a batch, is set according to the weight of a single flat cardboard box, taking human handling into considerations. For example, the value of the count setting for a stack is increased for a lighter sheet of cardboard box (i.e., a smaller cardboard box), because even a stack of a large number of sheets can be handled by humans. The value of the count setting for a stack is reduced for a heavier sheet of cardboard box (i.e., a larger cardboard box), because handling of a stack of a large number of sheets by humans is difficult.

An increased count setting for a stack lengthens the cycle for ejecting a stack from a counter ejector as a batch, i.e., the operating cycle of the counter ejector. Hence, it is possible to set a greater value to the time interval between when a stack reaches the count setting and when the stack is ejected from the stacking part, i.e., the retention interval of the stack on the stacking part. This also ensures that the top cardboard box is squared in a sufficient number of squaring.

In contrast, a smaller count setting for a stack shortens the cycle for ejecting a stack from a counter ejector as a batch, i.e., the operating cycle of the counter ejector. Hence, the time interval between when a stack reaches the count setting and when the stack is ejected from the stacking part, i.e., the retention interval of the stack on the stacking part, may become insufficiently short. As a result, the number of squaring carried out on the top cardboard box may be insufficient, resulting in insufficient squaring, which may lead to inadequate squaring.

In addition, larger cardboard boxes, for example, generally require a greater squaring number to attain adequate squaring.

Accordingly, for larger cardboard boxes, more frequent squaring is required and thus the feasible number of squaring may be limited. Hence, due to those two limitations, squaring of larger cardboard boxes may become inadequate.

To overcome this issue, it is contemplated to increase the number of squaring per flat cardboard box by setting a higher value to the squaring speed than the value of the machine speed. Setting a higher value to the machine speed while maintaining a greater squaring number, however, may induce significant mechanical vibrations generated by the squaring plate and the like, which makes the machines and cardboard boxes susceptible to damages. Accordingly, if the number of squaring per flat cardboard box is set in a unified manner, the need to increase the machine speed for achieving a higher productivity would not be satisfied.

In a configuration wherein cardboard boxes are slid under an ejecting and stacking part, from the upstream of the conveyance direction, as the one in Patent Document 2, the rectification plate is required to be escaped to the position to avoid an interference with a cardboard box that is fed at the timing when the cardboard box is fed, in order to avoid an interference between the cardboard box and the rectification plate. Thus, it is considered that the rectification plate is required to be reciprocated in accordance with the cycle for feeding cardboard boxes. In order to ensure that the top cardboard box that is fed the last undergoes a sufficient number of squaring, the retention interval of a stack in the ejecting and stacking part is required to be extended. This, in turn, extends the cycle for ejecting a stack as a batch, and makes speeding-up of the machine speed difficult.

The present invention has been conceived of in light of the aforementioned issues, and an object thereof is to provide a squaring device that enables adequate squaring irrespective of the feed speed of cardboard boxes and the number of cardboard boxes in a stack, and a counter ejector including the same, and further a box-manufacturing machine including the same.

Means to Solve the Issues (1) In order to achieve the above-described object, a squaring device of the present invention is a squaring device provided to a counter ejector part that stops flat cardboard boxes fed from an upstream, using a front stop, in a downstream part of a box-manufacturing machine, receives and stacks the flat cardboard boxes in a stacking part in a hopper part, and ejects the stack as a batch, the squaring device including: a squaring plate that, while the stacking part retains in a stack position during an retention interval, squares the cardboard boxes stacked on the stacking part, in conjunction with the front stop, the retention interval being set in accordance with a feed speed of the cardboard boxes and a count setting for a stack of the cardboard boxes; and a reciprocation driving unit that drives the squaring plate to reciprocate in directions approaching to or departing from the front stop, wherein the reciprocation driving unit is configured capable of varying a speed ratio of a squaring speed for reciprocating the squaring plate, to the feed speed.

Note that "configured capable of varying the speed ratio of the squaring speed to the feed speed" refers to the ratio of the squaring speed to the feed speed (speed ratio=squaring speed/feed speed) not being fixed to a constant, and includes the situation where the squaring speed is constant while the speed ratio is varied, or the situation where the speed ratio is varied and the squaring speed is also varied at an otherwise different change ratio, for example.

(2) Preferably, the stacking part is an elevator base that retains in an elevated position that is the stack position during the retention interval, the retention interval being set in accordance with the feed speed of the cardboard boxes and the count setting for a stack of the cardboard boxes.

(3) Preferably, the reciprocation driving unit includes: an actuator provided independently from a feed driving unit for feeding the cardboard boxes; and a control unit that controls the actuator to operate such that an operating speed of the actuator for driving the reciprocations equals a speed setting.

(4) Preferably, the reciprocation driving unit also includes: an actuator including a driving source for a feed driving unit for feeding the cardboard boxes, and a gearbox provided between the driving source and a driving shaft (squaring shaft) of the squaring plate; and a control unit that controls a gear ratio of the gearbox such that an operating speed of the actuator for driving the reciprocations equals a speed setting.

(5) In these cases, the control unit preferably includes a modification section that modifies the speed setting.

(6) Preferably, the control unit further includes: a data storage section that stores speed setting data that relates the speed setting modified by the modification section, to the feed speed and the count setting at that time; and an automatic setting section that, in response to a change in an order for the box-manufacturing machine, if the speed setting data corresponding to the new order is stored in the data storage section, automatically retrieves a speed setting corresponding to a feed speed and a count setting of the new order, using the speed setting data.

(7) Preferably, the control unit includes: a data storage section that stores in advance a series of speed setting data that relates speed settings to corresponding feed speeds and count settings, in a form of a database; and an automatic setting section that, in response to a change in an order for the box-manufacturing machine, automatically retrieves a speed setting corresponding to a feed speed and a count setting of the new order, using the database stored in the data storage section.

(8) Preferably, the modification section is configured to set the speed setting as a magnification of the squaring speed to the feed speed.

(9) Preferably, a value of two or greater is set as a default value for the magnification value.

(10) Preferably, in a low speed region of the feed speed, a value greater than that for a high speed region of the feed speed, is set as a default value for the magnification value.

(11) Preferably, the actuator includes: an electric motor, rotations of which are controlled by the control unit; a motion converting mechanism that converts a rotation motion of the electric motor into a reciprocating motion, and transmits the reciprocating motion to the squaring plate; and a linear guide member that guides the squaring plate to reciprocate in a predetermined direction.

(12) In this case, preferably, the motion converting mechanism includes: a squaring shaft that rotates, while a position of a rotation axis of the squaring shaft being fixed; an eccentric part including an eccentric outer circumferential face that protrudes from an outer periphery of the squaring shaft and has an eccentricity relative to the rotation axis; and a link member including a ring part having an inner circumferential surface that slidably engages with the eccentric outer circumferential face at one end, and a coupling part that couples to an end of the squaring plate with a pin at the other end, wherein the motion converting mechanism is configured to convert the rotation motion into the reciprocating motion at an sliding interface between the eccentric outer circumferential face and the inner circumferential surface of the ring part, and to transmit a motion by a belt pulley mechanism between the electric motor and the squaring shaft.

(13) A counter ejector of the present invention is a counter ejector provided in a counter ejector part that stops flat cardboard boxes fed from an upstream, using a front stop, in a downstream part of a box-manufacturing machine, receives and stacks the flat cardboard boxes in a stacking part in a hopper part, and ejects the stack as a batch, the counter ejector including: the front stop; the stacking part; and the aforementioned squaring device.

(14) Preferably, the stacking part is an elevator base that retains in an elevated position that is the stack position during the retention interval, the retention interval being set in accordance with the feed speed of the cardboard boxes and the count setting for a stack of the cardboard boxes, the counter ejector further includes: a ledge that operates when the number of the cardboard boxes stacked on the elevator base in the stack reaches the count setting, to receive cardboard boxes to form a subsequent stack; and an auxiliary ledge that is positioned below the hopper part to receive the stack on the ledge, and the elevator base ascends to an elevated position to receive the stack on the auxiliary ledge, and then retains in the elevated position until the number of received and accumulated cardboard boxes that are fed reaches the count setting.

(15) Preferably, the counter ejector further includes a press bar that advances into the hopper part when the number of the cardboard boxes in the stack on the elevator base reaches the count setting, and presses the stack reaching the count setting from the top, to hold the stack in conjunction with the elevator base, wherein the press bar continues to hold the stack reaching the count setting while descending with the elevator base, when the press bar descends from the elevated position of the elevator base to a lower position.

(16) In this case, the squaring plate of the squaring device preferably squares each cardboard box in the stack reaching the count setting sandwiched by the press bar and the elevator base, at least twice.

(17) Preferably, the counter ejector includes a lower conveyer including a conveying surface disposed along the lower position of the elevator base, to receive the stack on the elevator base in the lower position of the elevator base, wherein, after the stack is received by the lower conveyer, the press bar moves in a conveyance direction of the lower conveyer while holding the stack in conjunction with the lower conveyer to convey the stack, and passes the stack to an ejection conveyer and an upper conveyer that are disposed downstream to the lower conveyer.

(18) Furthermore, preferably, the ledge is configured to advance into the hopper part in synchronization with the advancement of the press bar into the hopper part, and to retract out of the hopper part in synchronization with a movement of the press bar in the conveyance direction of the lower conveyer, and the auxiliary ledge receives the stack on the ledge when the ledge retracts out of the hopper part.

(19) A box-manufacturing machine of the present invention includes the aforementioned counter ejector provided in a counter ejector part in a downstream part.

Effects of the Invention

In accordance with the present invention, the speed ratio of the squaring speed for reciprocating the squaring plate, to the feed speed is configured to be variable. Hence, in a situation where improper squaring possibly would occur due to a shorter retention interval of the stacking part in the stack position, for example, and the number of squaring by the squaring plate on the cardboard box that is fed the last may be insufficient, a sufficient number of squaring can be carried out, by setting the squaring speed for reciprocating the squaring plate to be faster than the feed speed. As a result, it is ensured that cardboard boxes adequately squared.

BRIEF DESCRIPTION OF DRAWINGS

FIGS. 7A-7D are side views showing operations of the counter ejector according to one embodiment of the present invention, together with FIGS. 8A-8C, wherein FIGS. 7A-7D are arranged in the time order;

FIGS. 8A-8C are side views showing operations of the counter ejector according to one embodiment of the present invention, together with FIGS. 7A-7D, wherein FIGS. 8A-8C are arranged in the time order.

EMBODIMENTS OF THE INVENTION

Hereinafter, an embodiment in accordance with the present invention will be described with reference to the drawings.

Figure 1:
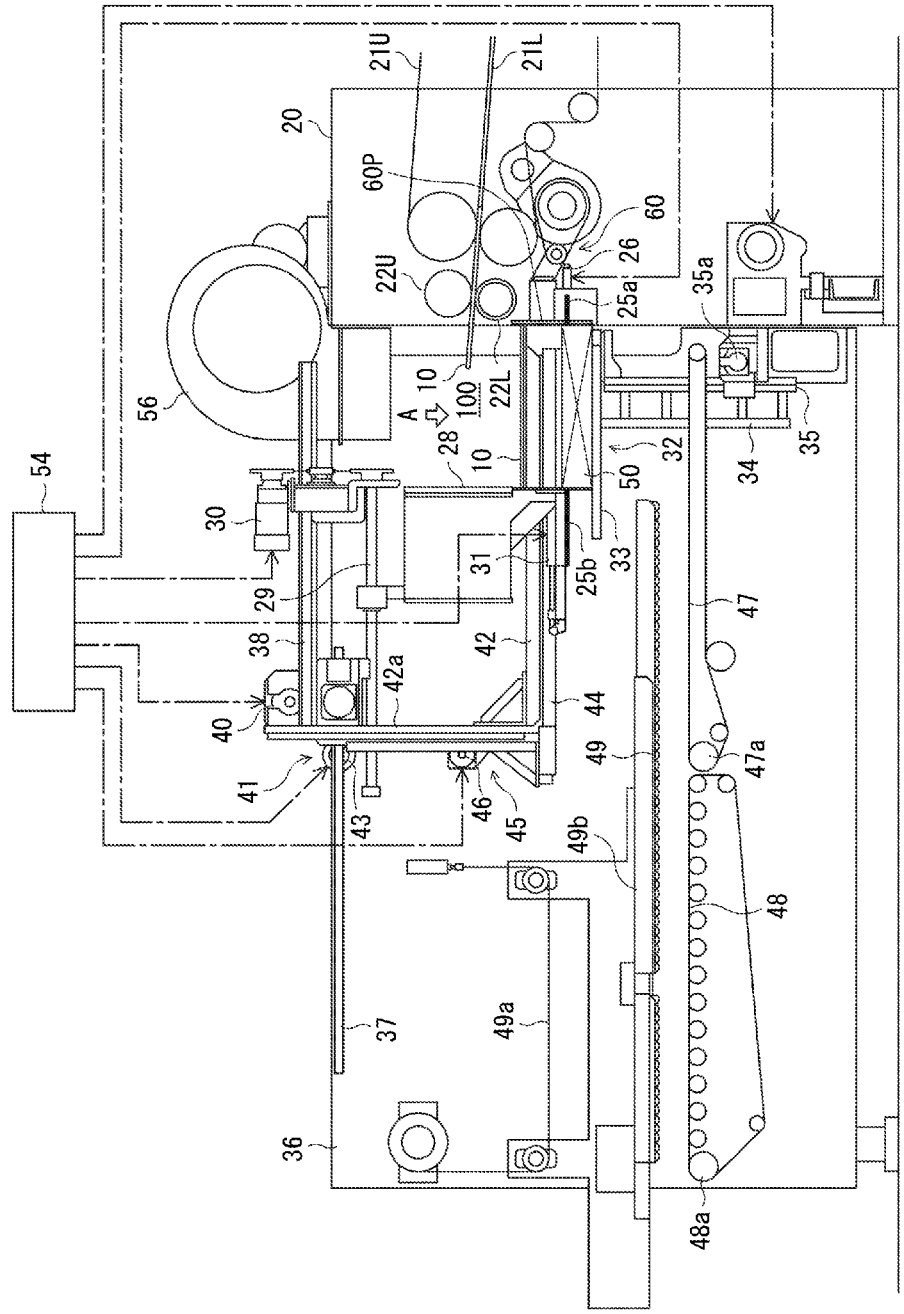
FIG. 1 is a side view showing an entire configuration of a counter ejector according to one embodiment of the present invention (drawing showing the inside of the counter ejector without illustrating frames and the like in front)
Figure 2:
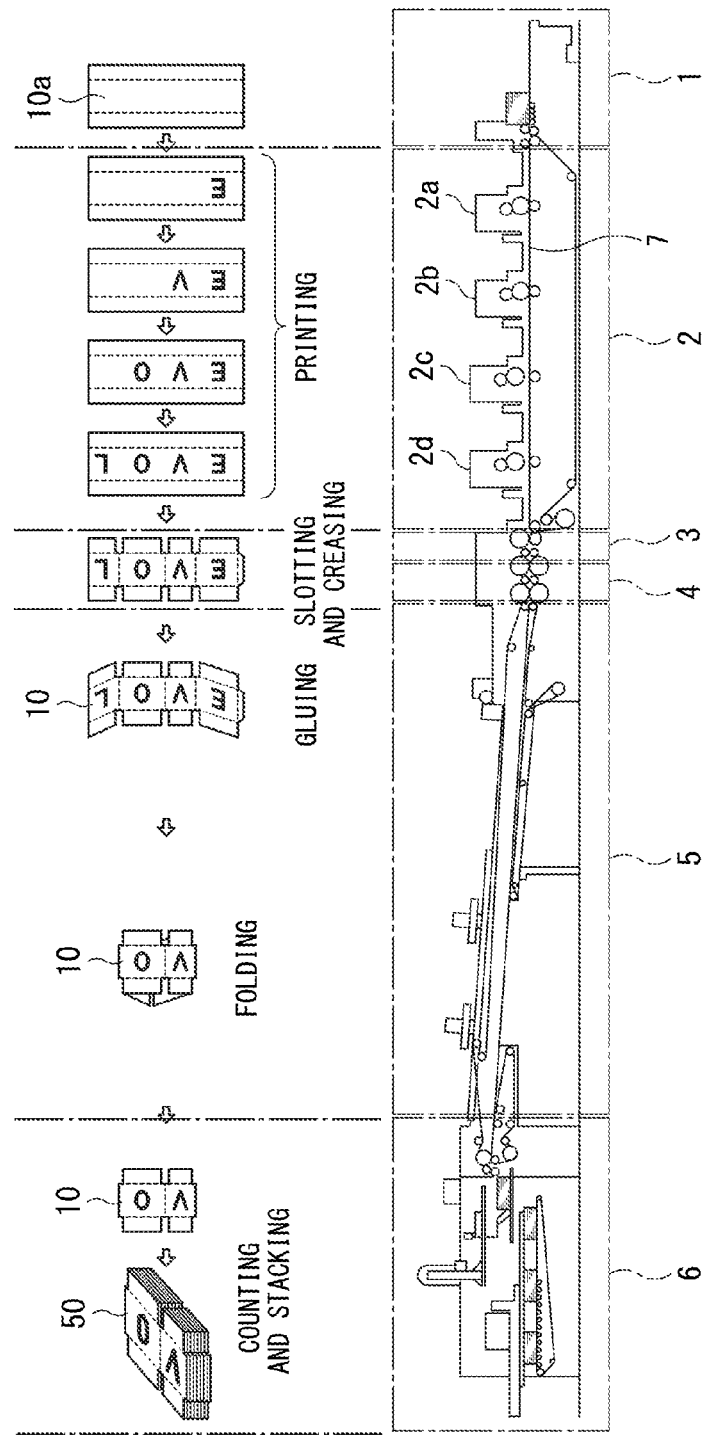
FIG. 2 is a side view showing a configuration of a box-manufacturing machine provided with the counter ejector according to one embodiment of the present invention.

FIG. 1 shows a configuration of a counter ejector in accordance with the present embodiment; FIG. 2 shows a configuration of a box-manufacturing machine in accordance with the present embodiment; and FIGS. 3-6 show a configuration of a squaring device in accordance with the present embodiment. The present embodiment will be described with reference to these drawings.

[1. Box-Manufacturing Machine]

Initially, a configuration of a box-manufacturing machine provided with a counter ejector in accordance with the present embodiment will be described.

FIG. 2 is a side view showing the configuration of the box-manufacturing machine, together with steps to process cardboard sheets (corrugated cardboard) into cardboard boxes in a flat configuration (materials to be formed into boxes; flat box sheet materials), above the respective device configurations corresponding to the steps in the box-manufacturing machine, separately from the device configuration. As shown in FIG. 2, this box-manufacturing machine is provided with a paper feeding part 1, a printing part 2, a paper ejecting part 3, a die cutting part 4, a folder gluer part 5, and a counter ejector part 6, from the upstream.

A stack of a large number of cardboard sheets 10a in the form of plate, is loaded into the paper feeding part 1, and the cardboard sheets 10a in the stack are provided (fed) one by one, to the printing part 2. The printing part 2 includes print units 2a-2d, each corresponding to a certain number of colors (four colors, in this example), and in the printing part 2, the print units 2a-2d sequentially carry out printing on the cardboard sheets 10a fed by a feeding conveyer 7 one by one, with inks of the respective colors.

The paper ejecting part 3 carries out slotting and creasing for a cardboard sheet 10a printed by the printing part 2. The die cutting part 4 processes the cardboard sheet 10a into a certain shape using a blanking die, and the folder gluer part 5 applies glue to the margins of right and left ends of the cardboard sheet 10a that underwent the slotting and creasing, and the cardboard sheet 10a is folded such that the right and left ends of the cardboard sheet 10a overlap on the back side (bottom). The right and left ends of the folded cardboard sheet 10a are bonded together with glue to obtain a cardboard box in a flat configuration (flat box sheet material) 10.

The counter ejector part 6 stacks flat box sheet materials 10 processed by the folder gluer part 5 while counting them. Once a predetermined number of flat box sheet materials 10 are stacked, the stack 50 is shipped as a single unit of batch.

[2. Counter Ejector]

Next, referring to FIG. 1, the counter ejector provided in the counter ejector part 6 (hereinafter, referenced to by reference symbol 6) will be described.

As shown in FIG. 1, a frame 20 is provided to each of both sides of the inlet of the counter ejector 6 in the machine cross direction, and a pair of upper and lower conveyer belts 21U, 21L (thereinafter, correctively referenced to by reference symbol 21) provided to the outlet (rearmost part) of the folder gluer part 5 and a pair of upper and lower feed rolls 22U, 22L (thereinafter, correctively referenced to by reference symbol 22) are attached to the frames 20. Below the feed rolls 22U, 22L, a squaring device 60 (described later) for rectifying the shapes of the flat box sheet materials 10 by pressing an end of a stack 50 (stack of multiple flat box sheet materials 10) is provided. Details of the squaring device 60 will be described later.

Under the outlet of the feed rolls 22, space (hopper part) 100 is defined in which flat box sheet materials 10 are to be stacked to form a stack 50.

Immediately under the squaring device 60, one auxiliary ledge 25a is attached so as to advance into and retract from the hopper part 100 by means of an air cylinder 26.

Furthermore, in front of the feed rolls 22, a front stop 28 that stops flat box sheet materials 10 ejected from the folder gluer part 5 is supported facing the feed rolls 22, such that the position of the front stop 28 can be adjusted in the back and forth direction (the conveyance direction of the flat box sheet materials 10 and the direction opposing thereto). In other words, the top of the front stop 28 is attached to a screw shaft 29 extending in the back and forth direction such that the front stop 28 moves in the back and forth direction when the screw shaft 29 is rotated driven by a rotation of a motor 30, thereby making the position of the front stop 28 adjustable. Under the front stop 28, the other auxiliary ledge 25b is provided so as to advance into and retract from the hopper part 100 by means of an air cylinder 31. The two auxiliary ledges 25a, 25b are arranged opposite from each other, and are configured to receive a stack 50 on the ledge 42, as will be described later.

Below the front stop 28, an elevator 32 having an elevator base 33 is provided, and the elevator base 33 is to receive and support flat box sheet materials 10 that hit the front stop 28 and fall, thereby serving as a stacking part to form a stack 50 by stacking the flat box sheet materials 10.

The elevator 32 includes a supporting shaft 34 that supports the base 33, a lifting mechanism 35 that ascends and descends the base 33 in conjunction with the supporting shaft 34, and a servo motor 35a that drives the lifting mechanism 35 and is configured to ascend or descend the base 33 by energizing the servo motor 35a.

Such operations of the elevator 32 is controlled by a controller (control unit) 54.

A side frame 36 is provided to each of the both sides in the machine cross direction on the downstream side of the counter ejector 6 in the conveyance direction, including the hopper part 100, and a rail 37 extending horizontally is provided to each of the side frames 36. A ledge support 38 is supported on each of the both rails 37 such that the ledge supports 38 travel along the rails 37. Specifically, each ledge support 38 includes rollers (not illustrated) traveling on the rail 37, pinions (not illustrated) that engage with racks (not illustrated) provided along the rail 37, and a ledge back and forth servo motor 40 for rotating the pinions, and the ledge supports 38 move in the back and forth direction driven by a rotation of the servo motor 40.

Each ledge support 38 is provided with a ledge 42 extending horizontally via a lifting mechanism 41. The lifting mechanism 41 is configured from a rack and pinion mechanism (not illustrated) and a ledge lifting servo motor 43 for rotating the pinion, and the ledge support 38 ascends or descends driven by a rotation of the servo motor 43. The ledge 42 is provided to be operated to receive flat box sheet materials 10 forming a subsequent stack 50, when the number of flat box sheet materials 10 in the stack 50 accumulated on the elevator 32 reaches a count setting.

A press bar 44 for pressing the stack 50 is supported on a longitudinal member 42a of the ledge 42 such that the press bar 44 can be ascended or descended by the lifting mechanism 45. The lifting mechanism 45 is also configured from a rack and pinion mechanism (not illustrated) and a press bar lifting servo motor 46 for driving the pinion, and the press bar 44 is ascended or descended driven by a rotation of the servo motor 46. When the ledge support 38 moves in the back and forth direction, the press bar 44 also moves in the back and forth direction in concert with the ledge 42.

A lower conveyer 47 is provided at substantially the same height level as that of the top surface of the elevator 32 when the elevator 32 descends to the lowest level, and downstream to the lower conveyer 47, an ejection conveyer 48 is provided at the same height level as that of the lower conveyer 47. The lower conveyer 47 and the ejection conveyer 48 are driven by a lower conveyer servo motor 47a and an ejection conveyer servo motor 48a, respectively. The inlet end of the lower conveyer 47 protrudes deeper into the elevator 32 such that even flat box sheet materials 10 in a minimum length (minimum length in the conveyance direction) are received.

Above the lower conveyer 47 and the ejection conveyer 48, an upper conveyer 49 is supported such that the height position of the upper conveyer 49 can be adjusted by means of a motion mechanism 49a, in order to sandwich a stack 50 in conjunction with the lower conveyer 47 and the ejection conveyer 48. The upper conveyer 49 can also be moved in the back and forth direction driven by a motion mechanism 49b, and is configured to move to a position at a certain distance from the front stop 28 according to the size of boxes, in conjunction with the front stop 28.

Above the hopper part 100, a blower (ventilation device) 56 is provided to blow air A to the top surfaces of flat box sheet materials 10 fed from the feed rolls 22.

In the most downstream part of the sheet feeding path of the folder gluer part 5, a photoelectric tube (detection means) that is not illustrated, is provided for detecting passage of a flat box sheet material 10. A passing signal P indicating that the photoelectric tube detects a passage of a sheet is sent to the controller 54.

The controller 54 is configured to calculate the time when a flat box sheet material 10 will reach the front stop 28, from a passing signal P of the flat box sheet material 10, information on the machine speed v (the rotation speed of the feed rolls 22) at that time, and the like, and to send a command signal (descending signal) N for controlling the operations of the ledge 42, to the servo motors 40, 41 serving as ledge driving unit. For example, when the controller 54 receives a passing signal P of a flat box sheet material 10, the controller 54 issues a descending signal N to the servo motor 41 after a delay expressed by $\Delta T=S/v$, where S represents the distance from the photoelectric tube to the front stop 28, and v represents the machine speed.

The controller 54 also controls the press bar lifting servo motor 46, the lower conveyer servo motor 47*a,* and the ejection conveyer servo motor 48*a* for controlling an ascent or a descent of the press bar 44 and timing to operate the lower conveyer 47 and the ejection conveyer 48. The controls on the servomotors 40, 41 for operating the ledge 42 and the controls on the servo motors 46, 47*a*, 48*a* are carried out in accordance with the count setting for a stack 50. The count setting for the stack 50 may be entered by an operator, or may be automatically set in accordance with the size of flat box sheet materials 10 that are ordered.

[3. Squaring Device]

Next, the squaring device 60 in accordance with the present embodiment will be described.

Figure 3:
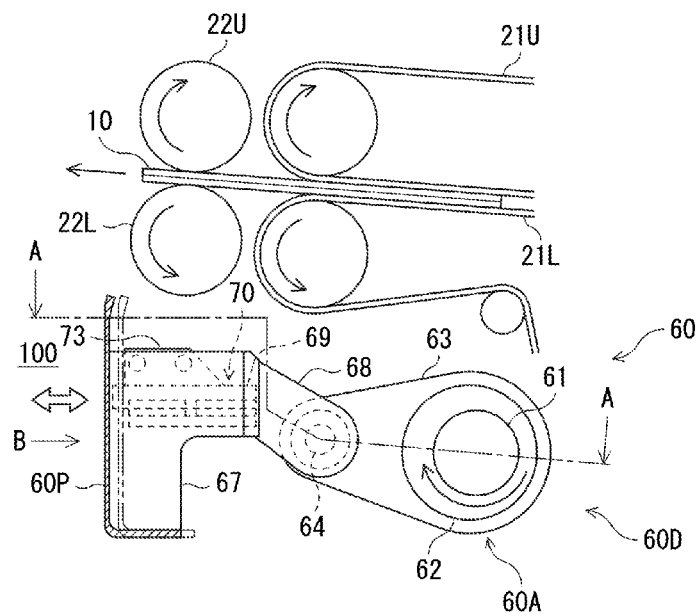
FIG. 3 is a side view showing a squaring plate according to one embodiment of the present invention, together with feed rolls.

As shown in FIG. 3, the squaring device 60 is provided with a squaring plate (also referred to as a rectification plate, a squaring bar, or a spanker) 60P that is positioned below the feed rolls 22 and extends in the machine cross direction, and a reciprocation driving unit 60D for driving the squaring plate 60P to reciprocate in the directions approaching to or departing from the front stop 28 that faces the squaring plate 60P, having a hopper part 100 (refer to the outlined arrow in FIG. 3) interposed therebetween. The reciprocation driving unit 60D is configured from a drive system (actuator 60A) and a control system (controller 54).

Figure 4:
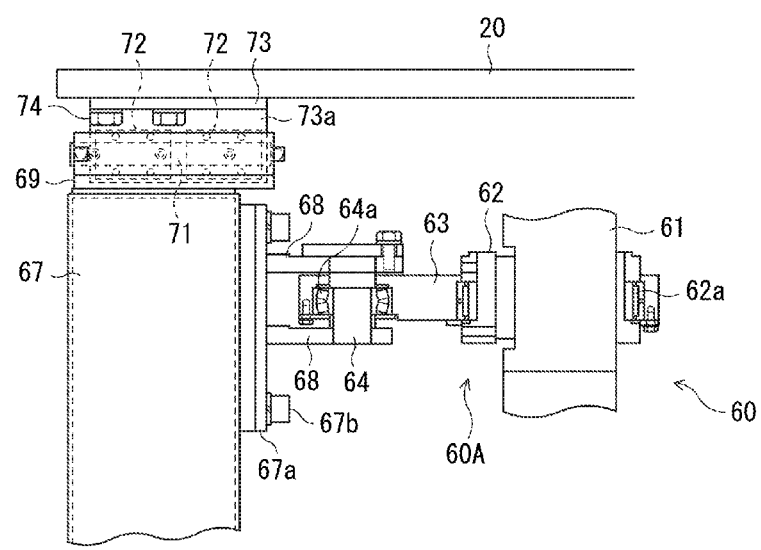
FIG. 4 is a plan view of one end part (the right end part in the conveyance direction) of the squaring plate according to one embodiment of the present invention (drawing viewing from the arrow A-A in FIG. 3)

As shown in FIGS. 3 and 4, the actuator 60A includes a squaring shaft 61 that is disposed so as to orient its axis line toward the machine cross direction and is rotated by a motor 80 (refer to FIG. 6); an eccentric ring 62 (eccentric part) that is coupled to the outer periphery of the both ends of the squaring shaft 61 so as to be rotated integrally with the squaring shaft 61; a link member 63, one end of which is rotatably coupled to the outer periphery of the eccentric ring 62 via a bearing 62*a* (ring part); a pair of arms 68 protruding toward the back of the squaring plate 60P from the respective brackets 67 provided at the both ends of the squaring plate 60P; and a pin 64 that is disposed parallel to the squaring shaft 61 at the protruding ends of a pair of arms 68 and is rotatably coupled to the other end of the link member 63 via a bearing 64*a*. Note that the squaring shaft 61 corresponds to a driving shaft to drive reciprocations of the squaring plate 60P.

Figure 6:
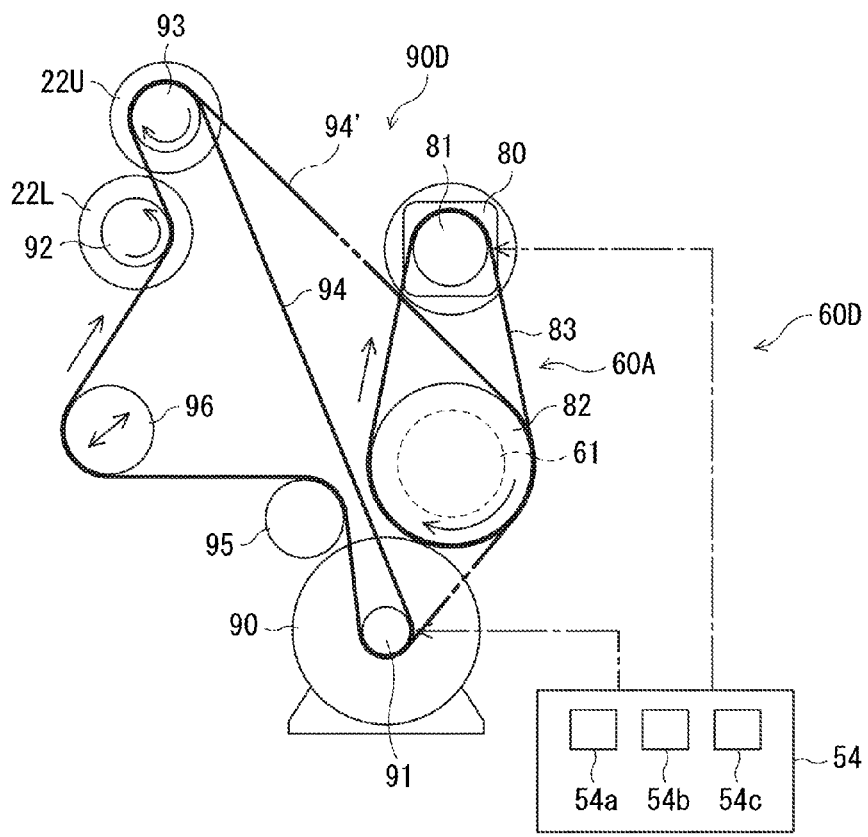
FIG. 6 is a side view showing a configuration of a drive system for the feed rolls and the squaring plate in the counter ejector according to one embodiment of the present invention.

Further, as shown in FIG. 6, the motor 80 for rotating the squaring shaft 61 is connected to the squaring shaft 61 via a belt pulley mechanism including a pulley 81 that is coupled to the rotation axis of the motor 80 so as to be rotated integrally with the rotation axis of the motor 80; a pulley 82 that is coupled to the squaring shaft 61 so as to be rotated integrally with the squaring shaft 61; and a belt 83 spanned around the pulleys 81, 82. Hence, the fixed gear ratio for driving the squaring shaft 61 by the motor 80 can be set by adjusting the ratio of the diameters of the pulleys 81, 82 (pulley ratio).

Particularly in this case, since the squaring shaft 61 is rotated at a constant speed by the motor 80 operating at a constant speed, the appropriate fixed gear ratio of the motor 80 and the squaring shaft 61 can be set by adjusting this pulley ratio such that the squaring shaft 61 rotates at the optimal rotation speed when the motor 80 is rotated at a constant speed, which is the optimum rotation speed of the motor 80 (the rotation speed for achieving the maximum performance). The actuator 60A also includes the motor 80 and belt pulley mechanisms 81-83.

Figure 5:
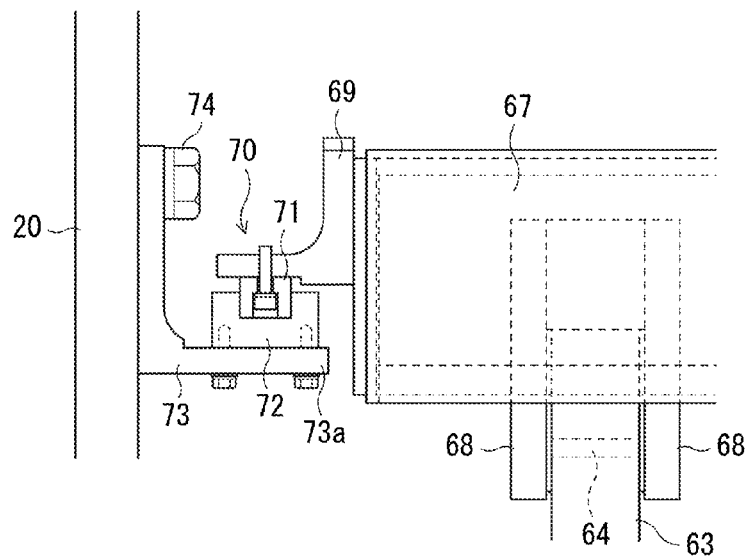
FIG. 5 is a front view of the one end part of the squaring plate according to one embodiment of the present invention (drawing viewing from the arrow B in FIG. 3)

Furthermore, a linear guide 70 is provided between each of the frames 20 and each of the brackets 67. As shown in FIGS. 3-5, the linear guide 70 includes a slider 71 and a groove rail 72. The slider 71 is horizontally and downwardly secured to a protrusion of a slider bracket 69 provided at the end on the side of frame 20 of the bracket 67 protruding toward the frame 20. A rail bracket 73 is secured to the frame 20 with a bolt 74 so as to protrude toward the bracket 67, and the groove rail 72 is disposed horizontally and upwardly in a groove formed in the top surface of a protrusion 73*a* of the rail bracket 73. The slider 71 is placed so as to slide horizontally along the groove in the groove rail 72, and thus the linear guide 70 guides the bracket 67 to reciprocate solely in the horizontal direction.

As the motor 80 rotates as shown by the arrows in FIG. 6, the squaring shaft 61 rotates as shown by the arrows in FIGS. 3 and 6. Since the outer circumferential face of the eccentric ring 62 that rotates in concert with the squaring shaft 61 has an eccentricity relative to the rotation axis of the squaring shaft 61, the link member 63 that is rotatably coupled to the outer periphery of the eccentric ring 62 moves relative to the rotation axis of the squaring shaft 61. The other end of the link member 63 is coupled to the arms 68 via the bearing 64*a* and the pin 64, and the bracket 67 provided with the arms 68 is guided by the linear guide 70 to reciprocate solely in the horizontal direction. As a result, the bracket 67 reciprocates in the horizontal direction driven by the movement of the link member 63, and the squaring plate 60P reciprocates in the horizontal directions approaching to or departing from the front stop 28.

Further, as shown in FIG. 6, the feed rolls 22L, 22U are rotated by a feed driving unit 90D employing a motor 90 different from the motor 80 for rotating the squaring shaft 61. The motor 90 is connected to the rotation axes of the feed rolls 22L, 22U via a belt pulley mechanism including a pulley 91 that is coupled to the rotation axis of the motor 90 so as to be rotated integrally with the rotation axis of the motor 90; a pulleys 92, 93 that are coupled to the rotation axes of the feed rolls 22L, 22U so as to be rotated integrally with the rotation axes of the feed rolls 22L, 22U, respectively; and a belt 94 spanned around the pulleys 92, 93. The belt 94 also contacts a fixed-position guide pulley 95 and an adjustable-position tension pulley 96, and the tension of the belt 94 can be adjusted by changing the position of the tension pulley 96. The feed driving unit 90D is configured from the motor 90, pulleys 91-93, 95, 96, and the belt 94. Note that the chain double-dashed line indicates the locus of the belt 94' when the squaring shaft 61 is rotated integrally with the feed rolls 22L, 22U.

As described above, the drive system for the squaring device 60 is configured independently from the drive system for the feed rolls 22, and operations of the respective motors 80, 90 of these drive systems are controlled by the controller 54. Furthermore, the reciprocation driving unit 60D of the squaring device 60 is configured capable of varying the ratio of the speed for reciprocating the squaring plate 60P by the actuator 60A (squaring speed), to the feed speed.

Here, the feed speed is defined as the number of cardboard boxes 10 fed from the feed rolls 22 per unit time, whereas the squaring speed is defined as the reciprocation speed (the number of reciprocations) of the squaring plate 60P by the actuator 60A per unit time, i.e., how many times a single flat box sheet material 10 is to be squared.

As functions of the controller 54 relating to the control on squaring, the controller 54 also includes a modification section 54a that modifies the speed setting; a data storage section 54b that saves the speed setting modified by the modification section 54a as speed setting data, the speed setting being related to (associated with) the feed speed and the count setting at present; and an automatic setting section 54c that, in response to a change in an order for the box-manufacturing machine, if speed setting data corresponding to a new order is stored in the data storage section 54b, automatically retrieves a speed setting corresponding to the feed speed and the count setting of the new order, using the speed setting data that is stored.

Alternatively, a series of speed setting data that relates speed settings to corresponding feed speeds and count settings, may be stored in advance in the data storage section 54b in a form of a database, and in response to a change in an order for the box-manufacturing machine, the automatic setting section 54c may automatically retrieve a speed setting corresponding to the feed speed and the count setting of the new order, using that database stored in the data storage section 54b. Thereby, suitable squaring numbers can be set for a wide variety of flat box sheet materials 10, which eliminates insufficient squaring.

As a matter of course, in the situation where no speed setting data related to the feed speed and the count setting at present is saved in the database for the speed setting modified by the modification section 54a, meaning a new data, the new data is captured into the database for enhancing the database.

Note that the feed speed is set based on the size and the like of flat box sheet materials 10 that are ordered. The feed speed may be entered by an operator, or may be automatically set in accordance with the size of the ordered flat box sheet materials 10. For example, smaller flat box sheet materials 10 have fewer constraints for the feed speed and permit relatively higher speed. In contrast, larger flat box sheet materials 10 require relatively low feed speeds since the flat box sheet materials 10 may be damaged or deformed, due to the behavior how the flat box sheet materials 10 are fed into the hopper part 100.

In this embodiment, the modification section 54a is configured to set the speed setting as a magnification of the squaring speed to the feed speed. The default value of the magnification in a low speed region of the feed speed is set to a value greater than that for a high speed region of the feed speed. In intermediate and low speed regions of the feed speed where the feed speed is equal to or lower than a predetermined speed, the default value of the magnification is set to two or more times higher value.

The default value of the magnification for the squaring speed in a relatively low speed region of the feed speed is set to be greater than that in a relatively high speed region of the feed speed, and the default value of the magnification in intermediate and feed speed regions of the feed speed is set to a value that is two or more times higher for the following reasons.

As the sizes of flat box sheet materials 10 increase, the count settings for stack 50 generally decrease. A smaller count setting for a stack 50 shortens the cycle of ejecting the stack 50 as a batch by the counter ejector part 6. In this case, the time interval between when a stack 50 reaches the count setting and when the base 33, serving as the stacking part for the stack 50, initiates a descent from the elevated position (stack position) to the lower position, i.e., the retention interval in the stacking part of the stack 50, may be insufficient. As a result, a sufficient number of squaring may not be performed on the flat box sheet material 10 on top that has been fed the last, which tends to induce insufficient squaring.

The above-described relationship is observed between the feed speed and the sizes of flat box sheet materials 10. For flat box sheet materials 10 have larger sizes, a lower feed speed has to be selected. In this case, the count setting for a stack 50 also has to be set to a smaller value, but the lower feed speed generally induces insufficient squaring of the flat box sheet material 10 that is fed the last. Also for the above reason, the default value of the magnification in a lower speed region of the feed speed is set to a value greater than the default value for a higher speed region of the feed speed.

Figure 9:
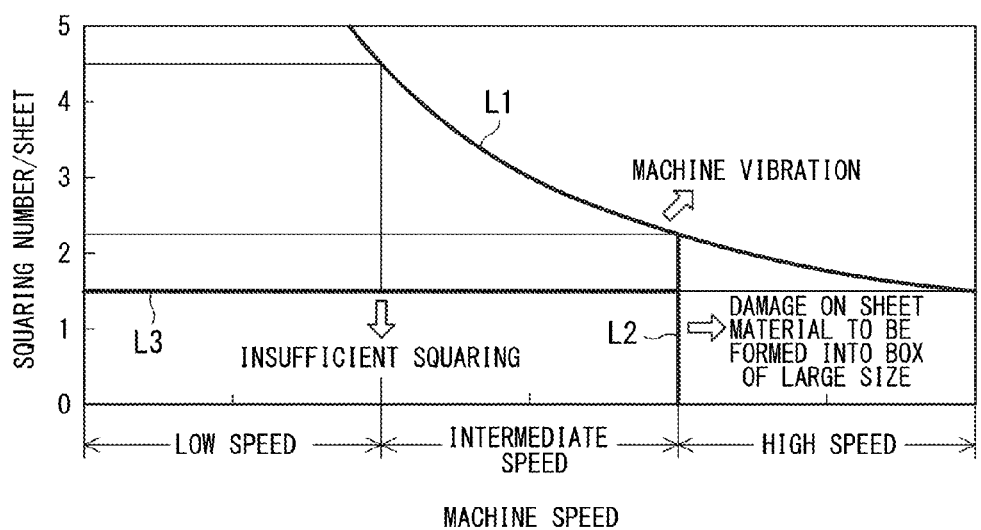
FIG. 9 is a chart showing the relationship (magnification) between the squaring speed and the feed speed, according to one embodiment of the present invention.

In this case, for satisfying the above-described condition, the motor 80 for rotating the squaring shaft 61 is rotated at a constant speed. FIG. 9 is a chart showing the relationship between the machine speed (equal to the feed speed) when the motor 80 is rotated at a constant speed, and the squaring number per sheet (i.e., the squaring speed). Constant squaring numbers per unit time are obtained when the motor 80 is rotated at constant speeds, and the squaring number per sheet is inversely proportional to the machine speed, where the squaring number per sheet is set to a greater value than that in a higher machine speed (feed speed) region, as the machine speed (feed speed) becomes lower.

In intermediate or low speed regions of the machine speed (feed speed), the squaring number per sheet is set to twice or more frequent. As a matter of course, although a higher constant rotation speed of the motor 80 permits higher squaring numbers per sheet, a higher rotation speed of the motor 80 may result in significant mechanical vibrations generated by the squaring plate and the like, which tends to induce damages on the machines or damages of cardboard boxes. From the above-described viewpoints, the upper limit of the rotation speed of the motor 80 is to be limited. The constant rotation speeds of the motor 80 are employed in the example shown in FIG. 9, taking those consideration into account, and the rotation speed is limited to the rotation speeds indicated by the curve L1 to suppress mechanical vibrations generated by the squaring plate and the like, since the constant rotation speed of the motor 80 equal to or greater than the rotation speeds indicated by the curve L1 in FIG. 9 causes significant mechanical vibrations.

In addition, in the case of large-sized flat box sheet materials 10, if a machine speed is set to the high speed region that is higher than the speeds indicated by the straight line L2, the flat box sheet materials 10 may be induced damages thereon. Accordingly, for large-sized flat box sheet materials 10, the machine speed is set to intermediate and low speed regions of equal to or smaller than the speeds indicated by the straight line L2. Since a squaring number per sheet smaller than 1.5, indicated by the straight line L3, may lead to insufficient squaring, the squaring number is set to 1.5 or more. Particularly for large-sized flat box sheet materials 10, the squaring number of twice or more frequent is used to ensure that insufficient squaring is prevented.

[4. Operations and Advantages]

Next, referring to FIG. 7 (FIGS. 7A-7D) and FIG. 8 (FIGS. 8A-8C), operations and advantages of the squaring device 60 will be described, while discussing operations of the counter ejector 6 in accordance with the present embodiment. Note that illustrations are given in FIGS. 7A-7D and FIGS. 8A-8C, focusing on the feed rolls 22, the auxiliary ledges 25a, 25b, the elevator base 33, the ledge 42, the press bar 44, the lower conveyer 47, the ejection conveyer 48, the upper conveyer 49, and the squaring plate 60P, which are main working elements. Furthermore, an example wherein flat box sheet materials 10 have a greater size and the count setting for a stack 50 is relatively small (e.g., several sheets), will be described.

Figure 7A:
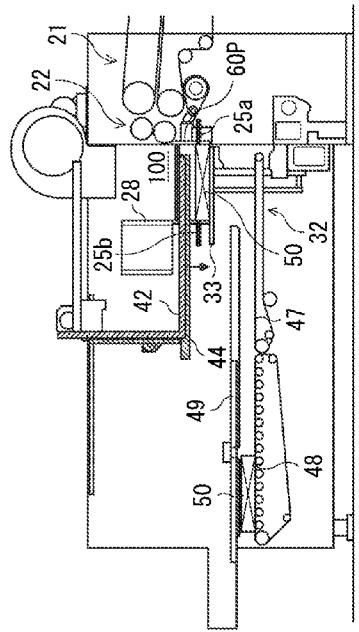
Figure 7B:
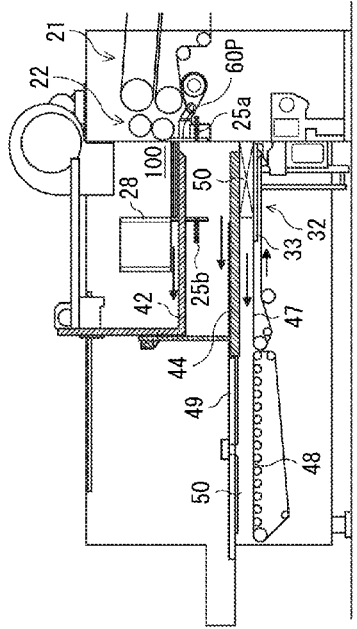

FIG. 7A shows the state immediately after the number of the flat box sheet materials 10 in a stack 50 on the elevator 32 reaches the count setting. At the moment when the flat box sheet material 10 that hits the count setting reaches the front stop 28, as shown in FIG. 7B, the ledge 42 and the press bar 44 included therein descend and receive the first flat box sheet material $10_1$ to form a subsequent stack 50a. The time when a flat box sheet material 10 will reach the front stop 28 is calculated from a sheet passing signal P indicating passage of the sheet end of the last flat box sheet material $10_n$ (e.g., the $5^{th}$) and information M indicating the machine speed at that time, and the descending command for the ledge 42 is issued and sent to the servo motor 41 based on the calculation.

Figure 7C:
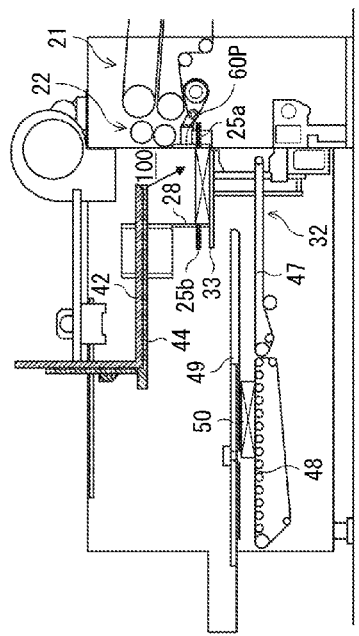
Figure 7D:
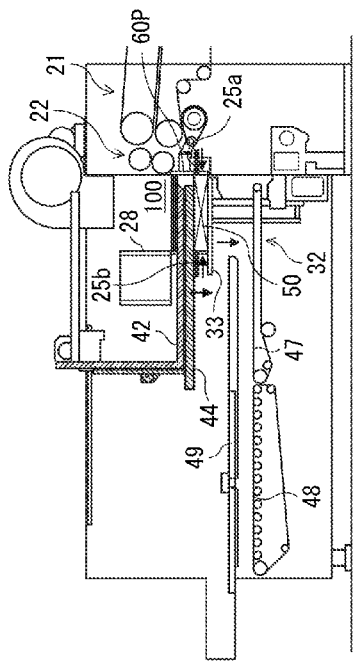

FIG. 7D shows the state where the elevator base 33 descends to the level of the lower conveyer 47. At the time indicated in FIG. 7B, once the ledge 42 is ready to receive flat box sheet materials one by one to form the subsequent stack 50a, the elevator 32 immediately starts to descend, as shown in FIG. 7C, and descends down to the level of the lower conveyer 47, as shown in FIG. 7D. In this case, in order to prevent collapse of the stack 50 by spring back, the press bar 44 is pressed down below the ledge 42, and the elevator base 33 descends while sandwiching the stack 50 in conjunction with the press bar 44.

Once the elevator base 33 reaches the lowest position, as shown in FIG. 8A, the stack 50 is supported by the lower conveyer 47 and is moved to the ejection direction while the lower conveyer 47 and the press bar 44 sandwich the stack 50. This enables the stack 50 to be conveyed without collapsing. Simultaneously, the ledge 42 also moves to the ejection direction. Before the ledge 42 starts to move, the auxiliary ledges 25a, 25b are advanced in the directions to face each other (toward the hopper part 100), and the subsequent stack 50a on the ledge 42 is transferred to the auxiliary ledges 25a, 25b as the ledge 42 moves.

Thereafter, as shown in FIG. 8B, the ledge 42 and the press bar 44 ascend and the elevator base 33 also ascends. As shown in FIG. 8C, the auxiliary ledges 25a, 25b are retracted in the direction departing from each other, and the subsequent stack 50a on the auxiliary ledges 25a, 25b is transferred to the elevator base 33. At the same time, the ledge 42 and the press bar 44 are advanced toward the hopper part 100. Thereafter, as shown in FIG. 7A, the stack 50 on the elevator 32 reaches the count setting.

In the manner as described above, once the number of flat box sheet materials 10 in the stack 50a reaches the count setting, the ejection step is repeated for ejecting the stack 50a as a batch. In such a case, the squaring plate 60P reciprocates at a predetermined speed, and presses the rear end of each of the flat box sheet materials 10 in a stack 50 placed on the ledge 42 or the auxiliary ledges 25a, 25b, and thereafter presses the stack 50 placed on the elevator base 33 in the elevated position, for carrying out squaring on each flat box sheet materials 10.

The flat box sheet material 10 at the top of the stack 50 undergoes squaring by the squaring plate 60P during the steps in FIGS. 7A-7C. If the flat box sheet materials 10 have a larger size and the count setting for a stack 50 is small, the ejection cycle is shortened. As a result, the retention interval for the elevator base 33 to retain in the elevated position is also shortened, and the flat box sheet material 10 on the top undergoes only a limited number of squaring.

In contrast, in the present configuration, since the motor 80 for rotating the squaring shaft 61 is set to a constant speed irrespective of the machine speed (feed speed), such that the squaring number per sheet is set to twice or more frequent for large-sized flat box sheet materials 10, thereby ensuring adequate squaring.

Furthermore, the speed setting for the motor 80 is modified to an appropriate speed by the modification section 54a, and the modified speed setting is saved in the data storage section 54b as speed setting data related to the feed speed and the count setting by the modification. For a subsequent orders having the similar conditions, the automatic setting section 54c automatically retrieves the corresponding speed setting from the stored data and sets the retrieved value, which helps to reduce burdens on operators and ensures even further adequate squaring.

[5. Miscellaneous]

While an embodiment of the present invention has been described above, the present invention is not limited to the aforementioned embodiment and the present invention may be practiced by modifying or omitting where appropriate, without departing from the gist of the invention.

Specifically, the squaring device in accordance with the present invention may be any squaring devices, as long as the squaring device includes a reciprocation driving unit for driving reciprocations of the squaring plate, which is configured capable of varying the speed ratio of the squaring speed to the feed speed, and is not limited to the one in the aforementioned embodiment. Furthermore, specific configurations of the elements in the counter ejector and the box-manufacturing machine exemplified in the aforementioned embodiment are merely exemplary, and their configurations may also be modified without departing from the gist of the invention.

For example, while the elevator base in the elevated position serves as a stacking part in the above-described embodiment, a main part of a lower conveyer belt can serve as a stacking part in the configuration where the lower conveyer belt directly receives a stack 50.

Furthermore, while the speed setting for the squaring speed is set as the magnification of the squaring speed to the feed speed in the above-described embodiment, the setting may not be limited to the one employing magnifications.

In addition, it is suffice in the present invention that the ratio of the squaring speed to the feed speed (speed ratio) is not fixed to a constant. Hence, the squaring speed may be maintained constant while the speed ratio is varied, as in the above-described embodiment. Alternatively, the speed ratio may be varied, or the squaring speed may be varied at an otherwise different change ratio. Particularly, the change ratio may be set as the speed ratio (magnification) of the squaring speed to the feed speed, using a gearbox.

In such a case, the drive system for the squaring device 60 can be configured employing the drive system for the feed rolls 22. Specifically, the actuator 60A configuring the reciprocation driving unit may be configured from the motor 90 serving as the driving source for the feed driving unit, and a gearbox provided between the motor 90 and the squaring shaft 61. For example, as indicated the chain double-dashed line denoted by the reference symbol 94' in FIG. 6, the belt 94 for driving rotations of the feed rolls 22L, 22U may also be spanned around the pulley 82 to drive the squaring shaft 61 by the motor 90 for driving rotations of the feed rolls 22L, 22U, and the gearbox is provided between the motor 90 and the squaring shaft 61, in order to change the speed ratio of the squaring speed to the feed speed. The gearbox may be provided between the pulley 82 and the squaring shaft 61, for example. The speed ratio of the squaring speed to the feed speed may be varied by controlling the gear ratio of the gearbox by the controller 54.

Furthermore, while the simplified control is achieved by employing a constant speed rotation for the motor 80 in the actuator 60A of the squaring device 60 in the above-described embodiment, the motor 80 may be controlled to operate at appropriate speeds.

In any case, as long as setting the speed setting to achieve a required squaring number even when the retention interval of the stacking part retaining in the stack position is short, adequate squaring on cardboard boxes can be achieved.

What is claimed is:

1. A squaring device provided to a counter ejector part that stops flat cardboard boxes fed from an upstream, using a front stop, in a downstream part of a box-manufacturing machine, receives and stacks the flat cardboard boxes in a stacking part in a hopper part, and ejects the stack as a batch, the squaring device comprising:
    a squaring plate that, while the stacking part retains in a stack position during an retention interval, squares the cardboard boxes stacked on the stacking part, in conjunction with the front stop, the retention interval being set in accordance with a feed speed of the cardboard boxes and a count setting for a stack of the cardboard boxes; and
    a reciprocation driving unit that drives the squaring plate to reciprocate in directions approaching to or departing from the front stop, wherein:
    the reciprocation driving unit comprises
    an actuator provided independently from a feed driving unit for feeding the cardboard boxes, and
    a control unit that controls the actuator to operate such that an operating speed of the actuator for driving the reciprocations equals a speed setting;
    the control unit comprises a modification section that modifies the speed setting;
    the modification section is configured to set the speed setting as a magnification of the squaring speed to the feed speed; and
    the reciprocation driving unit is configured capable of varying a speed ratio of a squaring speed for reciprocating the squaring plate, to the feed speed.

2. The squaring device according to claim 1, wherein the stacking part is an elevator base that retains in an elevated position that is the stack position during the retention interval, the retention interval being set in accordance with the feed speed of the cardboard boxes and the count setting for a stack of the cardboard boxes.

3. The squaring device according to claim 1, wherein the control unit comprises:
    a data storage section that stores speed setting data that relates the speed setting modified by the modification section, to the feed speed and the count setting at that time; and
    an automatic setting section that, in response to a change in an order for the box-manufacturing machine, if the speed setting data corresponding to the new order is stored in the data storage section, automatically retrieves a speed setting corresponding to a feed speed and a count setting of the new order, using the speed setting data.

4. The squaring device according to claim 1, wherein the control unit comprises:
    a data storage section that stores in advance a series of speed setting data that relates speed settings to corresponding feed speeds and count settings, in a form of a database; and
    an automatic setting section that, in response to a change in an order for the box-manufacturing machine, automatically retrieves a speed setting corresponding to a feed speed and a count setting of the new order, using the database stored in the data storage section.

5. The squaring device according to claim 1, wherein a value of two or greater is set as a default value for the magnification value.

6. The squaring device according to claim 1, wherein, in a low speed region of the feed speed, a value greater than that for a high speed region of the feed speed, is set as a default value for the magnification value.

7. The squaring device according to claim 1, wherein the actuator comprises:
    an electric motor, rotations of which are controlled by the control unit;
    a motion converting mechanism that converts a rotation motion of the electric motor into a reciprocating motion, and transmits the reciprocating motion to the squaring plate; and
    a linear guide member that guides the squaring plate to reciprocate in a predetermined direction.

8. The squaring device according to claim 7, wherein the motion converting mechanism comprises:
    a squaring shaft that rotates, while a position of a rotation axis of the squaring shaft being fixed;
    an eccentric part comprising an eccentric outer circumferential face that protrudes from an outer periphery of the squaring shaft and has an eccentricity relative to the rotation axis; and
    a link member comprising a ring part having an inner circumferential surface that slidably engages with the eccentric outer circumferential face at one end, and a coupling part that couples to an end of the squaring plate with a pin at the other end,
    wherein the motion converting mechanism is configured to convert the rotation motion into the reciprocating motion at an sliding interface between the eccentric outer circumferential face and the inner circumferential surface of the ring part , and to transmit a motion by a belt pulley mechanism between the electric motor and the squaring shaft.

* * * * *